US008637598B2

(12) United States Patent
Bernd et al.

(10) Patent No.: US 8,637,598 B2
(45) Date of Patent: Jan. 28, 2014

(54) LONG-FIBRE-REINFORCED, THERMOPLASTIC MOULDING COMPOUND, METHOD FOR PRODUCTION THEREOF AND USE THEREOF

(75) Inventors: Heinz Bernd, Heppenheim (DE); Bruno Wagner, Brechen (DE); Thomas Borgner, Bischofsheim (DE); Olaf Herd, Münster (DE)

(73) Assignee: Ticona GmbH, Suizbach (Taunus) (DE)

( * ) Notice: Subject to any disclaimer, the term of this patent is extended or adjusted under 35 U.S.C. 154(b) by 797 days.

(21) Appl. No.: 12/524,260

(22) PCT Filed: Jan. 23, 2008

(86) PCT No.: PCT/EP2008/000483
§ 371 (c)(1),
(2), (4) Date: Feb. 8, 2010

(87) PCT Pub. No.: WO2008/089963
PCT Pub. Date: Jul. 31, 2008

(65) Prior Publication Data
US 2010/0140829 A1    Jun. 10, 2010

Related U.S. Application Data

(60) Provisional application No. 60/899,187, filed on Feb. 2, 2007.

(30) Foreign Application Priority Data

Jan. 25, 2007   (DE) .......................... 10 2007 003 706

(51) Int. Cl.
*C04B 28/14*    (2006.01)
(52) U.S. Cl.
USPC ............ 524/423; 524/492; 524/493; 524/494
(58) Field of Classification Search
USPC .......... 524/423, 493, 494, 425, 426, 427, 492
See application file for complete search history.

(56) References Cited

U.S. PATENT DOCUMENTS

| | | | | |
|---|---|---|---|---|
| 4,207,373 A * | 6/1980 | Segal | ............................. | 156/158 |
| 5,082,889 A | 1/1992 | Koizumi et al. | | |
| 5,750,616 A | 5/1998 | Shimpuku et al. | | |
| 5,969,027 A * | 10/1999 | Chundury et al. | ............. | 524/436 |
| 6,521,693 B2 | 2/2003 | Saito et al. | | |
| 6,794,032 B2 | 9/2004 | Borgner et al. | | |
| 7,459,492 B2 * | 12/2008 | Arias Bautista et al. | ........ | 524/10 |
| 2006/0261508 A1* | 11/2006 | Lustiger et al. | ................ | 264/140 |
| 2006/0264543 A1* | 11/2006 | Lustiger et al. | ................ | 524/284 |
| 2008/0242793 A1 | 10/2008 | Yano | | |

FOREIGN PATENT DOCUMENTS

| | | |
|---|---|---|
| DE | 10012984 | 7/2001 |
| DE | 10108817 A1 | 9/2001 |
| DE | 10015984 A1 | 10/2001 |
| EP | 0382229 A1 | 8/1990 |
| JP | 4353536 A | 12/1992 |
| WO | WO 2005092972 A1 | 10/2005 |

OTHER PUBLICATIONS

Search Report for PCT/EP2008/000483 dated Apr. 28, 2008, 6 pages.
Test Method DIN 53 734.
P. Bowen, "Particle Size Distribution Measurement from Millimeters to Nanometers and from Rods to Platelets", *Journal of Dispersion Science and Technology*, vol. 23, No. 5, pp. 631-662, 2002.
Paul Schmidt, "Siebklassieren", *Chem.-Ing.-Tech*, 56 (1984)Nr. 12, S. pp. 897-907.
Etzler et al., Particle Size Analysis: A Comparison of Various Methods II, *Part. Part. Syst. Charact.* 14, (1997) pp. 278-282.

* cited by examiner

*Primary Examiner* — Peter D Mulcahy
(74) *Attorney, Agent, or Firm* — Dority & Manning, P.A.

(57) ABSTRACT

A long-fiber-reinforced, thermoplastic molding compound of plastics material has outstanding impact strength and notched impact strength if it contains 30 to 90% by weight of at least one thermoplastic polyolefin, 9 to 69% by weight of at least one glass-like reinforcing fiber and 1 to 30% by weight of at least one mineral filler of an average particle size in the range from 0.1 to 2 μm. The molding compound is produced by the pultrusion method and is used in the production of domestic appliances such as washing machines or washer-dryers or electrical appliances such as coffeemakers or toasters or refrigerators or in automobile construction.

18 Claims, No Drawings

LONG-FIBRE-REINFORCED, THERMOPLASTIC MOULDING COMPOUND, METHOD FOR PRODUCTION THEREOF AND USE THEREOF

RELATED APPLICATIONS

The present application claims priority to PCT International Application Serial No. PCT/EP2008/000483 filed Jan. 23, 2008 and which claims filing benefit of U.S. Provisional Patent Application Ser. No. 60/899,187 filed on Feb. 2, 2007 and German Patent Application Serial No. 10 2007 003 706.8 filed on Jan. 25, 2007, and which are hereby incorporated by reference in their entirety.

The present invention concerns a long-fiber-reinforced thermoplastic molding compound from plastic with excellent impact strength and notched impact strength. The invention also concerns a method for producing of this molding compound and its use in producing consumer objects.

Plastics, especially standard polymers like polyethylene (PE) or polypropylene (PP) are inexpensive materials that combine the advantages of low intrinsic weight, good processability on an industrial scale, and excellent resistance to chemical effects or moisture. For these reasons, PE and PP occur in numerous forms in many areas of daily life, including electrical and electronic components and household articles in the kitchen and bathroom. The automotive industry, however, has also made use of the advantages of PE and PP for its purposes, especially in terms of internal paneling and the decorative layout of vehicles.

Many applications of the materials made of PE and PP, however, still have unduly low thermal stability and for other applications the mechanical strength is insufficient.

A switch has therefore been made to add inorganic reinforcing materials as additives to the plastics to improve their mechanical properties. Particular successes along these lines were achieved with glass fibers, which are dipped in the form of long fibers into an emulsion or plastic solution, but preferably in their melt, which has led to a significant improvement in mechanical properties. DE 100 15 984 describes a percentage of glass fibers and plastics from 10 to 70 wt %, referred to the total weight of the glass fiber-reinforced molding compound.

To reduce costs, mineral fillers are also often added to the plastic. The change in the mechanical strength of plastics reinforced with glass fibers from such particulate inorganic additives is described by J. Hartikainen et al. in Plastic, Rubbers & Composites, Vol. 33, pages 77 to 84, but not clearly pointing in one direction. Inorganic materials, like talc, lime, chalk, gypsum, silicon dioxide and other minerals are mentioned as additives in the prior art. Fillers like talc and lime, which normally produce an improvement in the modulus of elasticity (Young's modulus) in PP in many cases, however, lead to a surprising reduction in strength and toughness of the molding compound provided with them. It is therefore assumed that properties of the filler itself, like its chemical composition, geometric form or particle size, but also interface behavior and homogeneous distribution within the polymer matrix, are ultimately responsible for the resulting mechanical properties of the mixture.

The task of the present invention was therefore to provide a molding compound based on fiber-reinforced PE or PP, which has higher impact strength and notched impact strength than known fiber-reinforced molding compounds but at the same time enjoys the special price advantage of plastics reinforced with fillers.

This task is solved by a molding compound of the type just mentioned, whose characteristic feature is seen in the fact that it contains
30 to 90 wt % of at least one thermoplastic polyolefin,
9 to 69 wt % of at least one glass-like reinforcing fiber and
1 to 30 wt % of at least one mineral filler, the average particle size of the mineral filler in the range of 0.1 to 2 µm, expressed as a value of $d_{50}$.

With respect to the solution to this task, is also helpful if the mineral filler has an anisotropy (aspect ratio) of 1 to 10, preferably 1 to 5, and especially 1 to 2.

Additional α-olefin polymers like ethylene or propylene can be used according to the invention as thermoplastic polyolefin. Examples of this are PE, with high, medium or low density or PP or polymethylpentene and copolymers of these olefins. The polymers can be straight-chain or branched. Mixtures of the mentioned polymers can also be used.

High density polyethylene (HDPE) is preferable to PE, which is produced in the presence of appropriate catalysts of the Ziegler, Phillips type or metallocene catalysts on an industrial scale in the gas phase or in suspension at 50 to 150° C. and under pressures ranging from 2 to 80 bar.

PP is preferably used as the thermoplastic polyolefin, which is produced in the presence of an appropriate catalyst of the Ziegler, Philips type or a metallocene catalyst. A partially crystalline polypropylene based on polypropylene has proven to be a particular suitable PP. These include mostly partially crystalline isotactic propylene homopolymers with an isotactic fraction of >90%, a degree of crystallinity of >50% and a melt flow index MFI (230/5), measured according to ISO 1133 at a temperature of 230° C. and under a contact load of 5 kg from 0.5 to 70 g/10 min or partially crystalline syndiotactic propylene homopolymers with a syndiotactic fraction of >80%, a syndiotactic sequence length of >10, a degree of crystallinity of >30%, and an MFI (230/5) from 0.5 to 70 g/10 min or a partially crystalline ethylene/propylene or propylene/1-olefin block copolymers or propylene/ethylene/1-olefin block terpolymers with $C_4$ to $C_8$ 1-olefins with ethylene and/or 1-olefin fraction from 2 to 30 wt % and with an MFI (230/5) of 0.5 to 50 g/10 min or partially crystalline statistical ethylene/propylene or propylene/1-olefin copolymers or statistical propylene/ethylene/1-olefin terpolymers with $C_4$ to $C_8$ 1-olefins with an ethylene and/or 1-olefin fraction from 2 to 30 wt % and with an MFI (230/5) from 0.5 to 70 g/10 min.

Different materials can be used according to the invention as reinforcement fibers. Typical examples of reinforcement fibers with a high melting point or softening point are glass fibers, carbon fibers, metal fibers and polyamide fibers. Glass fibers are preferably used as reinforcement fibers. Bundles of glass fibers with a diameter from 8 to 25 µm, preferably 10 to 20 µm, especially 12 to 17 µm, and with a weight from 500 to 4800 g per 1000 m glass fiber roving are then used with particular preference. Such rovings are preferably surface-treated to improve their process.

The rovings are obtained by pretreating a number of individual fibers with an aqueous emulsion or solution of a certain size and then bundled. Prefabricated rovings that are bundled, dried and wound onto coils (direct rovings) are preferably used for the molding compound according to the invention.

Fillers that are inexpensive and have a preferable average particle size, expressed as a value of $d_{50}$, ranging from 0.1 to 2 µm, preferably 0.3 to 1.5 µm, and especially 0.5 to 1.0 µm are added as mineral fibers to the thermoplastic polyolefin according to the invention. Examples of appropriate fillers according to the invention are calcite ($CaCO_3$) or glass spheres or ground glass or gypsum (CaSO$_4$) or barium sulfate or silica in their different forms.

The mineral fillers are added according to the invention to the thermoplastic polymer in finely divided form. The particles of the mineral fillers if possible have an anisotropic (aspect ratio) from 1 to 10, preferably from 1 to 5, and especially 1 to 2.

The molding compound according to the invention, in addition to the already mentioned main components polypropylene and reinforcement fiber and mineral filler, can also contain:
a) Oxidation stabilizers, like sterically hindered phenols, thioethers, phosphites or phosphonites in an amount from 0.1 to 1 wt %,
b) Sulfur- and phosphorus-containing costabilizers from 0.1 to 1 wt %,
c) Metal deactivators to 1.5 wt %,
d) Processing auxiliaries like strongly polar to nonpolar polypropylene or polyethylene waxes up to 1 wt % and
e) Ethylene-propylene or ethylene-propylene terpolymer rubber from 0 to 10 wt %,
in which all the wt % data mentioned above under a) to e) refer to the total weight of the molding compound produced from the mixture of individual components.

The invention also concerns a method for producing the molding compound just described, which used to be known as the pultrusion method. The bundles of reinforcing fibers are then passed together with a melt of thermoplastic through a nozzle, whereupon the bundles or reinforcement fibers together with the plastic are passed over a shaping nozzle and the formed rovings are cooled, finally formed, and then cut along the running direction or wound as an endless structure.

A rod-like product is obtained in the pultrusion method according to the invention. The rods have a length from 3 to 100 mm, preferably 4 to 50 mm, and especially 5 to 15 mm, their diameter lying in the range from 1 to 10 mm, and preferably 2 to 8 mm.

The molding compound according to the invention has an impact strength of more than 42 kJ/m$^2$ measured according to ISO 179.

The molding compound according to the invention has a notched impact strength of more than 20 kJ/m$^2$ measured according to ISO 75.

The molding compound according to the invention can be used with particular advantages for the production of household appliances, like washing machines or dryers, but is also suited for other electrical appliances like coffee machines, toasters, refrigerators, and the like. It can also be advantageously used in automaking, where molded articles with a particularly high impact strength are needed, especially in the area of bumpers or hubcaps. The molding compound according to the invention can also be used for the production of computer housings or television housings and mobile phones.

The invention will be further explained below by practical examples for one skilled in the art, especially by comparing molding compounds not according to the invention in comparative examples. The average particle size means, unless otherwise stated, the d$_{50}$ value that is determined by air jet screening according to DIN 53734.

EXAMPLE 1

According to the Invention

A molding compound of thermoplastic propylene homopolymer, glass fibers and calcite is produced for which the weight ratio of glass fibers and calcite is shown in Table 1.

The impact strength and notched impact strength of the mixture are then measured, which are also shown in Table 1.

A homopolymer with a melt flow index MFI of 48 g/10 min measured according to ISO 1133 at a temperature of 230° C. and a contact weight of 2.16 kg was used for example 1 as thermoplastic polypropylene. An E glass, direct roving with 2400 tex was used as glass fibers. Hydrocarb 95T-OG (Omya GmbH), with an average particle size of 0.8 μm and an anisotropy of 1.2, was used as calcite.

The ingredients of the molding compound were initially melted in an extruder in a weight ratio as shown in Table 1 at 230° C. The glass fiber roving was then dipped into the molten plastic in the melt nozzle. The amount of glass fiber was set by adjusting the discharge speed and amount to the molten plastic to be added to each other. The strand-like molding compound of plastic, glass fiber, and filler was then passed from the melt nozzle through a shaping nozzle onto a shaping roll and simultaneously cooled. The strand-like molding compound could then be cut with a strand granulator into rod-like individual parts with a length of about 10 mm to facilitate transport and processing.

TABLE 1

| Example | GF/calcite (g/g) | Tensile strength (MPa) | Impact strength (kJ/m$^2$) | Notched impact strength (kJ/m$^2$) |
|---|---|---|---|---|
| 1 | 37/1.77 | 110 | 46 | 25 |

EXAMPLE 2

Comparative Example

The method according to example 1 was repeated, but with the difference that calcite with an average particle size of 2.7 μm was used as filler (Millicarb OG; Omya GmbH). The amounts of glass fibers and filler are shown in Table 2.

TABLE 2

| Example | GF/calcite (g/g) | Tensile strength (MPa) | Impact strength (kJ/m$^2$) | Notched impact strength (kJ/m$^2$) |
|---|---|---|---|---|
| 2 | 37/1.77 | 105 | 40 | 19 |

The comparative example shows that the mechanical properties of molded compounds deteriorate with increasing average particle size of the calcite.

The invention claimed is:
1. Long-fiber-reinforced thermoplastic molding compound from plastic, characterized in that it contains 30 to 90 wt % of at least one thermoplastic polyolefin, 9 to 69 wt % of at least one reinforcement fiber, wherein the at least one reinforcement fiber is selected from the group consisting of glass fibers, carbon fibers, and metal fibers, and 1 to 30 wt % of at least one mineral filler, characterized in that the average particle size of the mineral filler expressed as a value of d$_{50}$ ranges from 0.1 to 2 μm, wherein the mineral filler is a material selected from the group consisting of calcite, glass spheres, ground glass, gypsum, barium sulfate, and silica, the mineral filler having an aspect ratio of from 1 to 5.

2. Molding compound according to claim 1, characterized in that it contains an additional α-olefin polymer.

3. Molding compound according to claim 1 or 2, characterized in that the compound contains a partially crystalline polypropylene based on propylene homopolymer as the thermoplastic polyolefin, which has an isotactic fraction of >90%, a degree of crystallization >50% and a melt flow index MFI (230/5), measured according to ISO 1133 at 230° C. and a contact load of 2.16 kg from 0.5 to 70 g/10 min.

4. Molding compound according to claim 1, characterized in that the reinforcement fiber further comprises polyamide fibers.

5. Molding compound according to claim 1, characterized in that the compound contains glass fiber rovings that are surface treated.

6. Molding compound according to claim 1, characterized in that the compound contains mineral fillers with an aspect ratio ranging from 1 to 2.

7. Molding compound according to claim 1, characterized in that the mineral filler comprises calcite ($CaCO_3$).

8. Method for the production of a molding compound according to claim 1, wherein the reinforcement fibers are initially passed together with a melt of the thermoplastic polyolefin through a nozzle, the reinforcement fibers forming a reinforcement fiber roving, the reinforcement fiber roving together with the plastic is then passed over a shaping nozzle and shaped, whereupon the formed roving is cooled, shaped, and then cut across the running direction or wound as an endless structure.

9. Method according to claim 8, further comprising producing a rod in which the rod has a length of from 3 to 100 mm.

10. An article comprising the molding compound according to claim 1, the article comprising a household appliance, an electrical appliance, or an automaking part.

11. An article comprising the molding compound according to claim 1, the article comprising a computer housing, a television housing, or a mobile telephone.

12. Molding compound according to claim 1, further comprising a polymethylpentene.

13. Molding compound according to claim 2, wherein the additional α-olefin polymer comprises a copolymer of ethylene or propylene.

14. Molding compound according to claim 1, wherein the thermoplastic polyolefin is a material selected from the group consisting of a partially crystalline ethylene/propylene, a propylene/1-olefin block copolymer, and a propylene/ethylene/1-olefin block terpolymer with $C_4$ to $C_8$ 1-olefins with an ethylene and/or 1-olefin fraction from 2% to 30% by weight.

15. Molding compound according to claim 1, wherein the reinforcement fiber comprising glass fibers comprises bundles of glass fibers with a diameter of 8 to 25 microns and a weight of 500 to 4800 g per 1000 m.

16. Molding compound according to claim 7, wherein the mineral fillers have an aspect ratio of from 1 to 2.

17. Molding compound according to claim 1, wherein the thermoplastic polyolefin has a MFI (230/5), measured according to ISO 1133 at 230° C. and a contact load of 2.16 kg of from 0.5 to 70 g/10 minutes.

18. Molding compound according to claim 17, wherein the thermoplastic polyolefin is a material selected from the group consisting of a partially crystalline ethylene/propylene, a propylene/1-olefin block copolymer, and a propylene/ethylene/1-olefin block terpolymer with $C_4$ to $C_8$ 1-olefins with an ethylene and/or 1-olefin fraction from 2% to 30% by weight.

* * * * *